(12) United States Patent
Keller et al.

(10) Patent No.: US 6,569,246 B2
(45) Date of Patent: May 27, 2003

(54) POWDER COATING ASSEMBLY (75) Inventors: Christoph Keller, Hauptwil (CH); Horst Adams, Altstatten (CH); Bernd Lutz, Uberlingen (DE); Daniel Ziwica, Freidorf (CH)

(73) Assignee: Wagner International AG, Alstatten (CH)

( * ) Notice: Subject to any disclaimer, the term of this patent is extended or adjusted under 35 U.S.C. 154(b) by 39 days.

(21) Appl. No.: 09/771,327

(22) Filed: Jan. 26, 2001

(65) Prior Publication Data

US 2001/0039920 A1 Nov. 15, 2001

(30) Foreign Application Priority Data

Feb. 9, 2000 (DE) .......................... 100 05 656

(51) Int. Cl.[7] ............................... B05C 15/00
(52) U.S. Cl. ....................... 118/309; 118/308; 118/326; 454/53; 55/DIG. 46
(58) Field of Search ................. 118/308, 309, 118/312, 326, DIG. 7; 454/50, 53; 55/DIG. 46

(56) References Cited

U.S. PATENT DOCUMENTS

| 4,715,314 A | | 12/1987 | Ramseier et al. |
| 5,056,460 A | | 10/1991 | Vöhringer |
| 5,107,756 A | * | 4/1992 | Diaz ........................ 118/326 |
| 5,296,031 A | * | 3/1994 | Seiler et al. ........... 118/DIG. 7 |
| 5,680,670 A | | 10/1997 | Adams et al. |
| 5,690,995 A | * | 11/1997 | Fischli et al. ............... 118/309 |

FOREIGN PATENT DOCUMENTS

| DE | 3343996 A1 | 6/1985 |
| DE | 3704551 C1 | 5/1988 |
| DE | 3919614 A1 | 12/1990 |
| DE | 4300837 A1 | 7/1994 |
| DE | 19549186 A1 | 7/1997 |
| EP | 0 200 681 B1 | 8/1990 |
| EP | 0 384 236 B1 | 1/1993 |
| EP | 0 727 258 B1 | 10/1999 |

* cited by examiner

*Primary Examiner*—Richard Crispino
*Assistant Examiner*—Yewebdar T Tadesse
(74) *Attorney, Agent, or Firm*—Fenwick & West LLP

(57) ABSTRACT

A powder coating assembly comprising a compartment (1) in which workpieces (3) are coated with powder and which includes a discharge belt (15) for conveying excess powder to a recovery unit (5) or a filter unit (4) is characterized in that both a recovery unit (5) and a filter unit (4) are provided, each connected by a separate conduit (16; 18) to an exhaust opening (17; 19) of the compartment (1), and in that a shutoff member (42) is provided in the separate conduits (16; 18) for selectively blocking conveyance of powder to the filter unit (4) or the recovery unit (5).

14 Claims, 7 Drawing Sheets

POWDER COATING ASSEMBLY

FIELD OF THE INVENTION

The invention relates to a powder coating assembly as defined in the preamble of claim 1.

BACKGROUND OF THE INVENTION

For workpiece powder coating, the workpiece is guided through a powder coating compartment and coated with powder inside that compartment. Not all of the powder fed into the compartment through the applicator devices does deposit on the workpiece. A large part of the excess powder settles on the floor of the compartment.

In the case of conventional compartments this excess powder is sucked out of the compartment by means of a fan. However, when it is attempted to remove the excess powder from the compartment simply by subjecting the exhaust opening to the low pressure generated by the fan, the suction effect remains restricted to a relatively small area around the exhaust opening. On the other hand, the powder continues to accumulate on the remainder of the floor areas.

This disadvantage can be mitigated by provision of a baffle means such as specified in EP 0 384 236 B1. Such a baffle means reduces the settling of powder on the floor of the compartment.

Another way of reducing accumulations is disclosed in EP 0 200 681 B1. In that case the floor of the compartment has the configuration of a V-shaped trough the sidewalls of which are inclined in opposite directions, an exhaust port being disposed at the lowest location. Excess powder now may slide along the inclined sidewalls of the trough down into the exhaust port. With this structure, however, the floor of the compartment is not walkable as would be desirable for purposes of inspection and maintenance work.

With another known compartment (EP 0 727 258 B1) the floor of the compartment is formed by a walkable discharge belt. Any powder accumulated on the floor is conveyed by the discharge belt through the compartment and to an exhaust opening at the front end. In this manner powder can be removed also from those areas which are not located in the direct vicinity of the exhaust opening.

All the compartments described above provide for conveyance of the excess powder through an exhaust opening either to a powder recovering installation or directly to a filter unit if recovery is dispensed with.

A powder coating assembly 1 is known from U.S. Pat. No. 5,107,756. The flow of excess powder in that case can be directed either directly to the filter unit or to a recovery unit, by means of a switchover flap. In addition, a shutoff member is provided which selectively may block a supply channel to the recovery unit or simultaneously block this supply channel and a return channel of the recovery unit. This structure is complicated and expensive. The switchover and shutoff elements are located at positions which tend to get very contaminated in operation. Cleaning when colors are changed, therefore, is very time consuming and does not produce satisfactory results.

SUMMARY OF THE INVENTION

It is the object of the invention to provide a powder coating assembly of the kind defined initially which permits quick and simple switchover from operation with filters to operation with recovery of excess powder, and vice versa, widely avoiding any contamination while allowing rapid, easy and efficient cleaning.

The powder coating assembly according to the invention, provides separation of the mode which includes powder recovery and the mode which includes direct filtering of the excess powder through the filter. In this way contamination is widely avoided and cleaning expenditure minimized.

DESCRIPTION OF THE DRAWING

The invention will be described in greater detail below, by way of example, with reference to the accompanying drawings, in which.

DETAILED DESCRIPTION OF THE INVENTION

The powder coating assembly illustrated in FIGS. 1 to 4 comprises a compartment 1 divided in longitudinal direction into two halves 11, 12 to permit passage of a conveyor means 2 from which workpieces 3 are suspended. The conveyor means 2 may transport the workpieces 3 continuously or in stepwise fashion through the compartment 1 in which they are coated. The compartment 1 has a inlet side 13 and an outlet side 14. The floor of the compartment is formed by a discharge belt 15 for excess powder, the discharge belt 15 is adapted to be driven in opposite directions, as indicated by the double arrow P. A conduit 16 having an exhaust opening 17 through which excess powder is sucked off opens into the inlet side 13 directly above the discharge belt 15. At the outlet side 14 and likewise directly above the discharge belt 15, a conduit 18 has an exhaust opening 19 through which excess powder sucked off.

The outlet side 14 also might be embodied by a closed wall. In that event the workpieces 3 would be moved into the compartment 1 in the direction marked F and would be removed from the same in opposite direction after having been coated.

The conduit 16 leads directly to a filter unit 4 of known design, while the conduit 18 leads to a recovery unit embodied in the instant case by a conventional cyclone 5. The filter unit 4 includes a filter inlet casing 41 located at the side facing the compartment 1 and having side by side inlets for conduits 6, 16 and a slide valve 42 in its interior. A third or interconnecting conduit 6 connects the outlet region 51 of the cyclone 5 to the filter inlet casing 41 and, right next to it, also the conduit 16 leading from the compartment 1 to the filter unit 4 opens into the filter inlet casing. The slide valve 42 is movable in the filter inlet casing 41 in translatory sense in the direction of arrow S between two blocking positions for the conduits 6, 16. When in the position illustrated in FIG. 1, the slide valve 42 shuts off transportation of powder from the recovery unit 5 through the interconnecting conduit 6 into the filter unit 4. When in the position illustrated in FIG. 4, the slide valve 42 blocks direct conveyance of powder from the compartment 1 through the conduit 16 into the filter unit 4. At the same time, the slide valve 42 clears the respective other conduit, 16 in FIG. 1 or 6 in FIG. 4, for supply to the filter unit 4.

Figure 1:
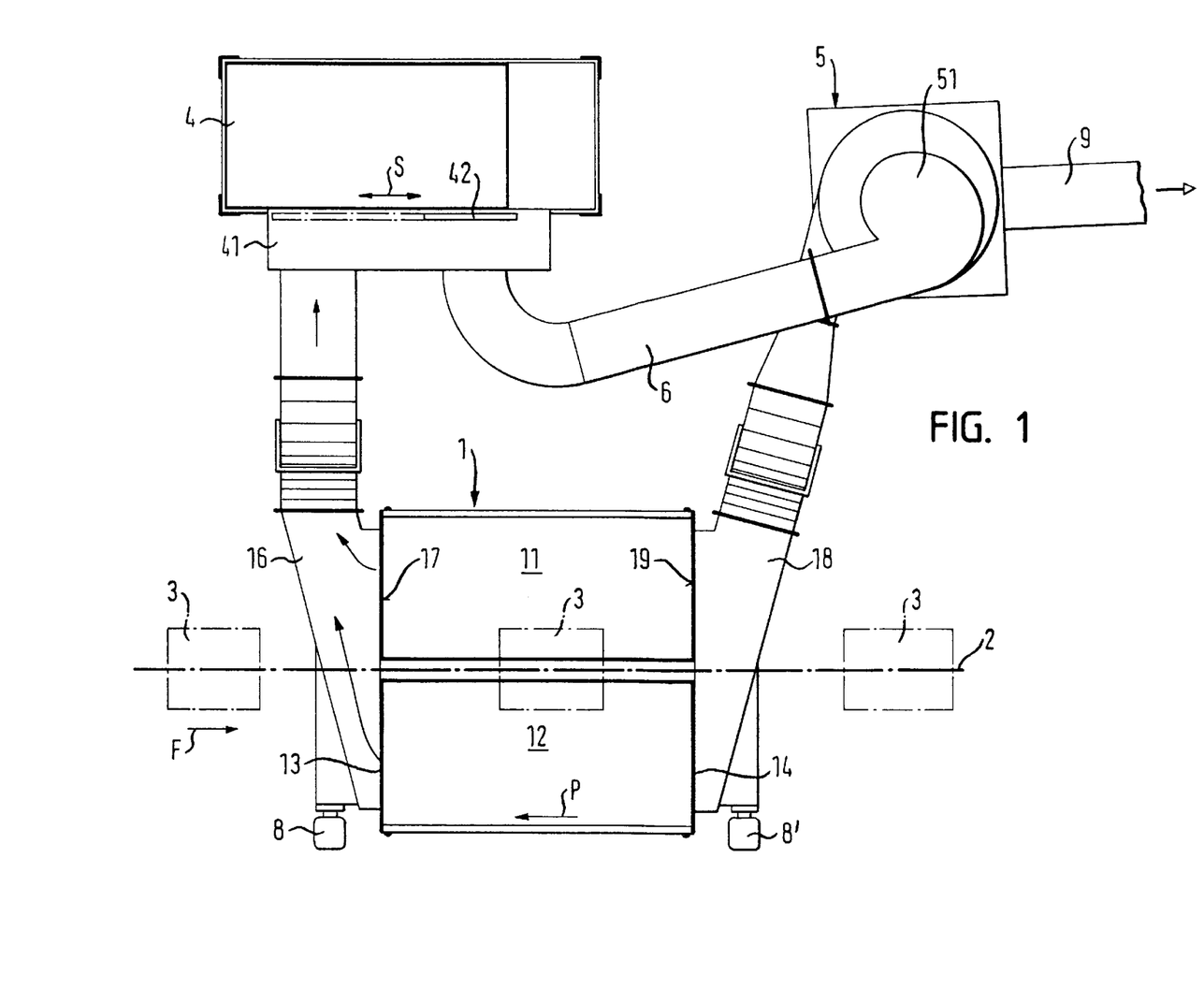
FIG. 1 is a top plan view of a powder coating assembly in accordance with a first embodiment of the invention, showing an operational state with direct filtering of removed excess powder.
Figure 4:
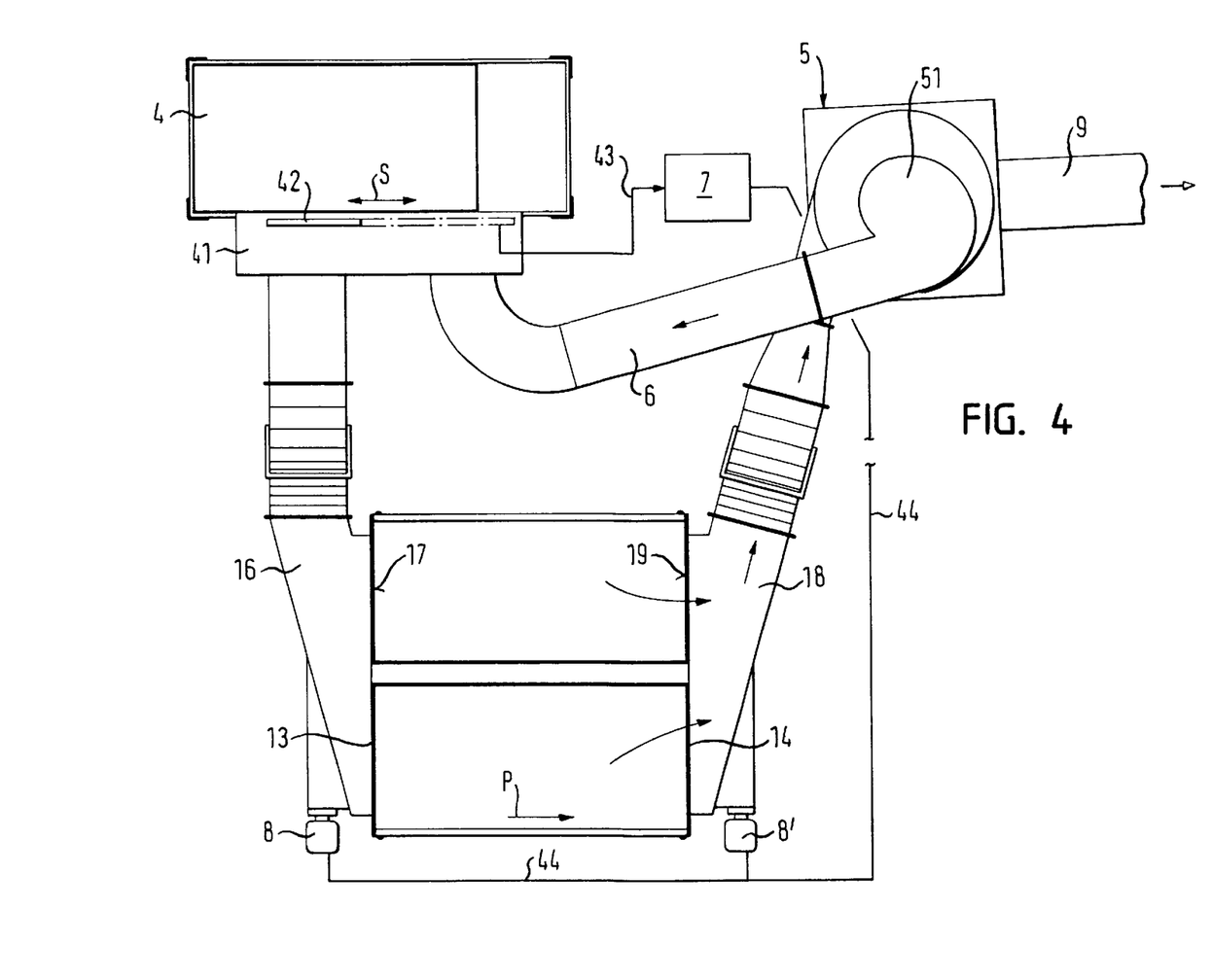
FIG. 4 is a top plan view, similar to FIG. 1, showing the powder coating assembly according to FIG. 1 in an operational state with recovery and subsequent filtering of removed excess powder.

The drive means, generally marked 8 and 8' in FIGS. 1 and 4, provided to move the discharge belt 15 are switched in response to the position of the slide valve 42. The drive means 8 thus will pull the discharge belt 15 from right to left, as seen in FIG. 1, so that excess powder accumulated on the discharge belt 15 will be sucked off through the exhaust opening 17 into the conduit 16 and on into the filter unit 4 by a fan (not shown) mounted inside the filter unit 4. With the slide valve 42 in the position according to FIG. 4, the drive means 8' will pull the discharge belt 15 from left to right so that excess powder accumulated on the discharge belt 15 will be sucked off through the exhaust opening 19 into the conduit 18 and then first into the recovery unit 5. A minor portion of the excess powder which cannot be recovered in the recovery means 5 is sucked through the interconnecting conduit 6 into the filter unit 4. The filter unit 4 in this case accomplishes refiltering. The major part of the excess powder, however, having passed the recovery unit 5 is fed back into the powder circulation path through a drain pipe 9. In principle, a single drive means would be sufficient for the discharge belt 15. The provision of two drive means 8, 8' is advantageous as belt tension thus is maintained constantly.

The direction of movement of the discharge belt 15 is reversible automatically in response to the position of the slide valve 42.

As an alternative, the reversal of the direction in which the discharge belt 15 is driven may cause a corresponding enforced change in position of the slide valve 42. To accomplish that, a control unit 7 is provided, as indicated in FIG. 4. In the instant case a respective signal representing the slide valve position and supplied to the control unit 7 through a line 43 causes the control unit 7 to emit a reversing signal which is supplied through a line 44 to the drive means 8 or 8' of the discharge belt 15.

Figure 2:
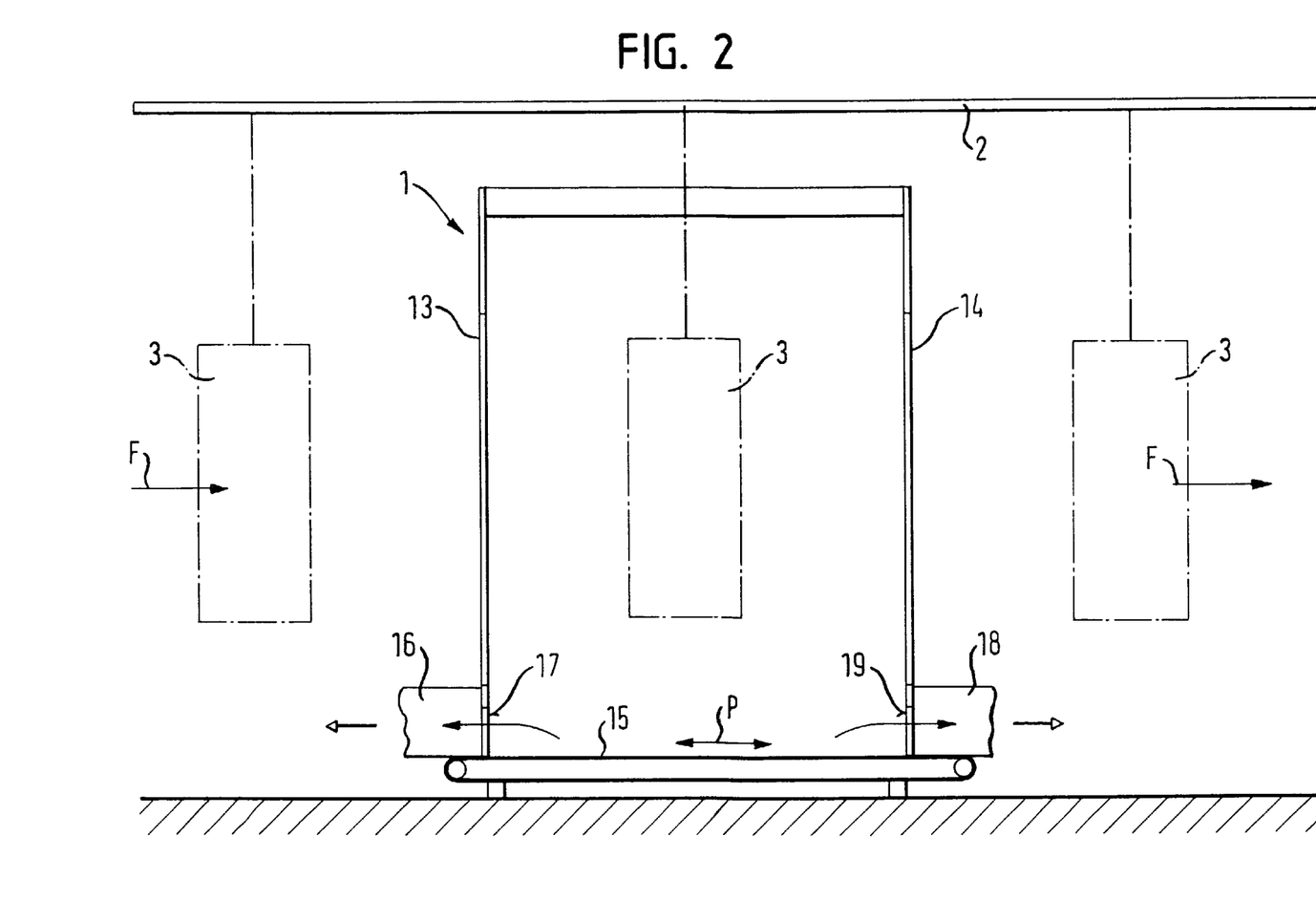
FIG. 2 is a diagrammatic longitudinal sectional view of a compartment of the powder coating assembly shown in FIG. 1.
Figure 3:
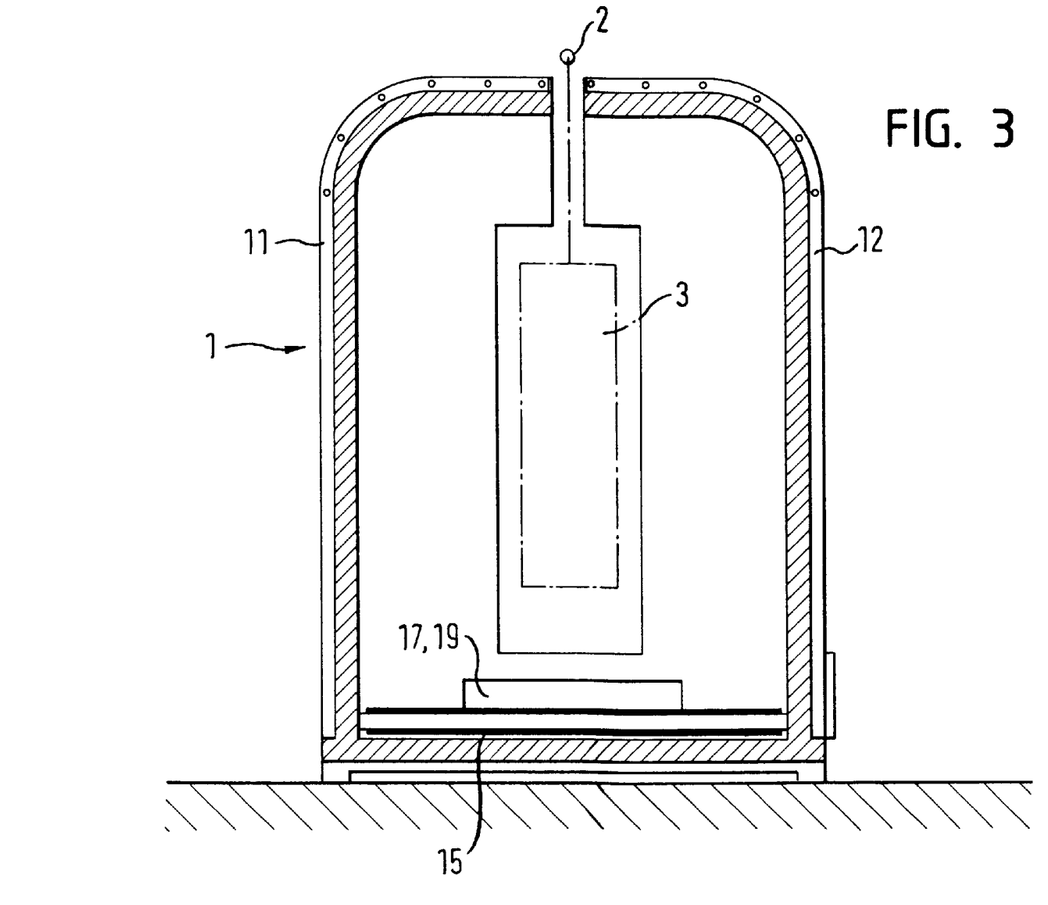
FIG. 3 is a diagrammatic cross sectional view of the compartment shown in FIG. 2.

Apart from the mode of feeding powder into the filter unit 4 exclusively through conduit 16 or exclusively through conduits 18 and 6, the powder coating assembly offers a third mode of operation which is selected in particular for cleaning purposes. With this third mode, the slide valve can be moved into such a position that simultaneous supply of excess powder through conduits 16 and 18 and 6 into the filter unit 4 becomes possible. The slide valve 42 does not block either of the two inlets into the filter unit 4 entirely, but instead leaves them open at least in part. At this position, therefore, the conduits 16; 18 and 6 communicate at least partly with the filter unit 4. In principle, the discharge belt 15 then may be driven selectively to the left towards exhaust opening 17 or to the right towards exhaust opening 19. Movement of the discharge belt 15 in the direction of the exhaust opening 17, i.e. to the left in FIGS. 1, 2, and 4, is preferred as the powder deposited on the discharge belt 15 inside the compartment 1 is transported directly into the filter unit 4. At the same time, purifying air is swept through the conduits 18 and 6 and especially also through the cyclone 5 which is particularly susceptible to clogging. Together with the cleaning, this mode of operation permits coating of workpieces 3 which are being moved through the compartment 1. This offers optimum utilization of the powder coating assembly according to the invention.

Figure 5:
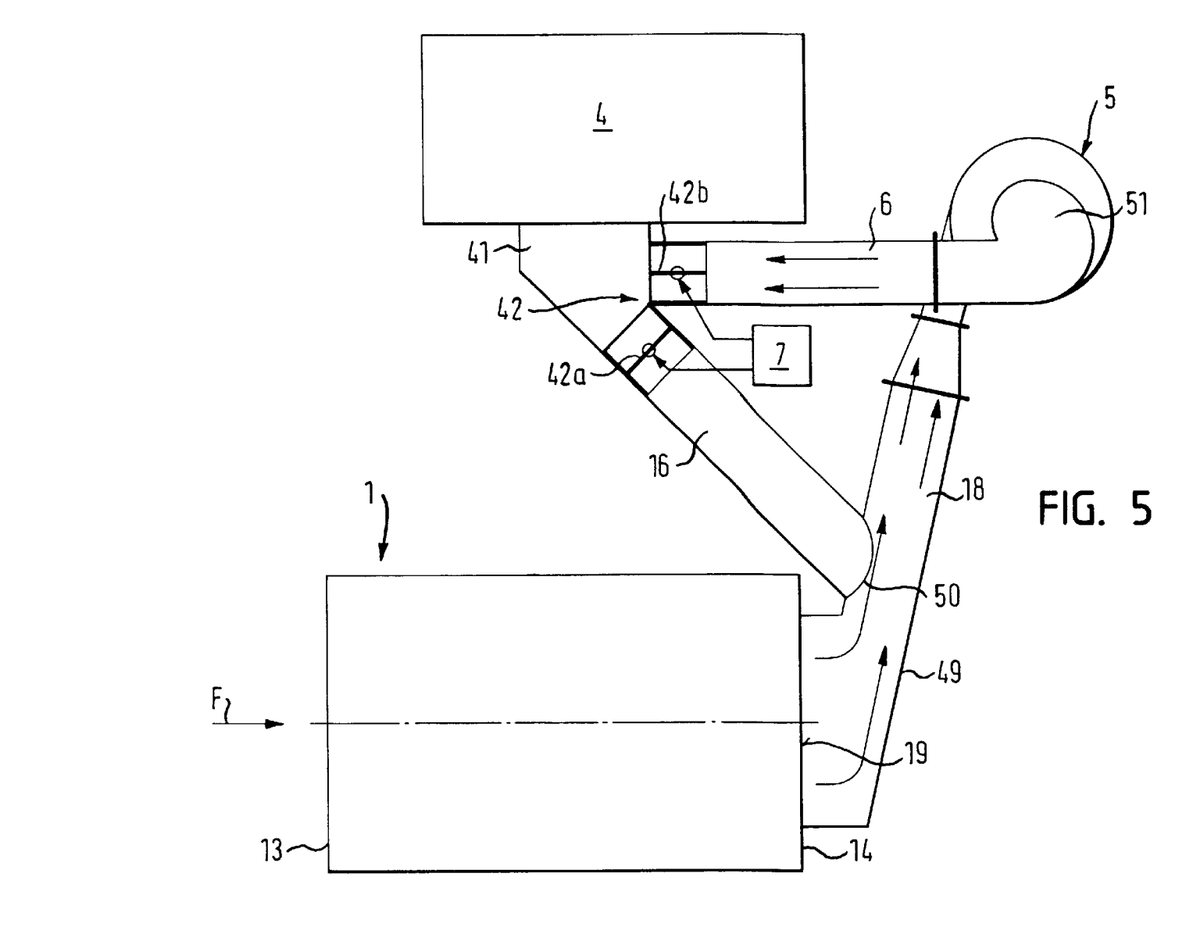
FIG. 5 is a top plan view, partly in section, of a powder coating assembly according to a second, especially advantageous embodiment of the invention in a first operating position.
Figure 6:
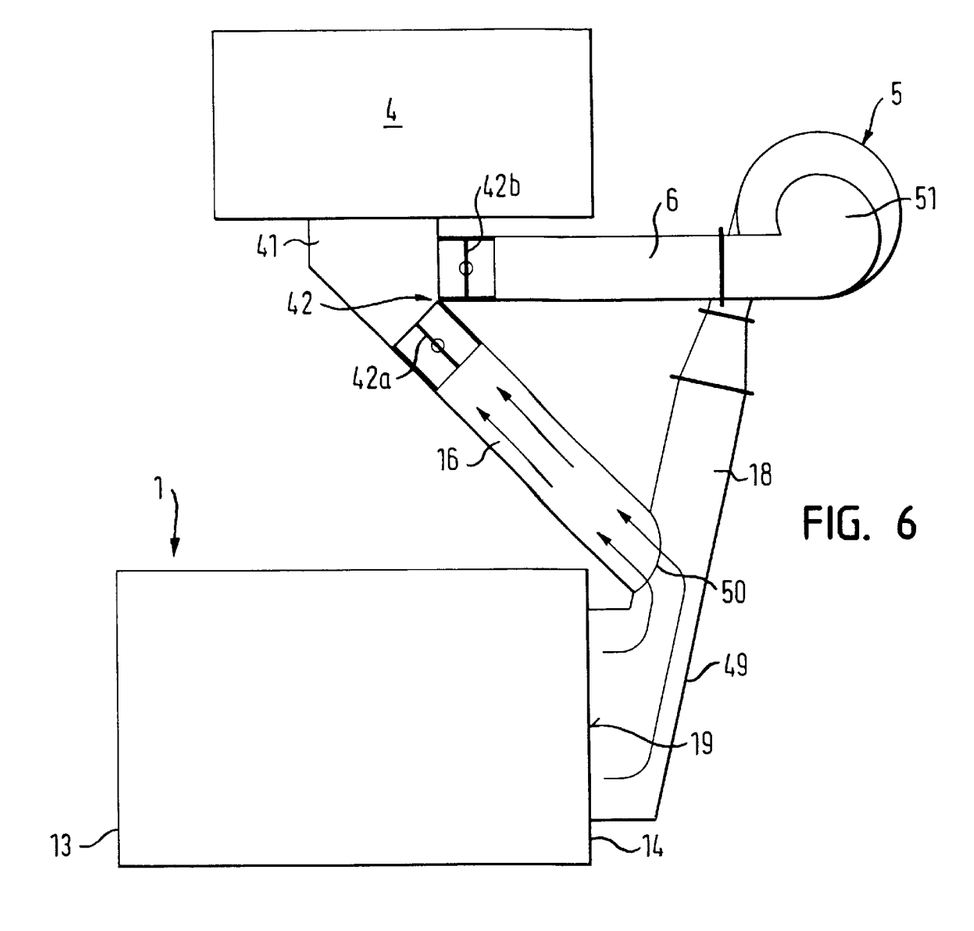
FIG. 6 is a top plan view, similar to FIG. 5, of the second embodiment in a second operating position.
Figure 7:
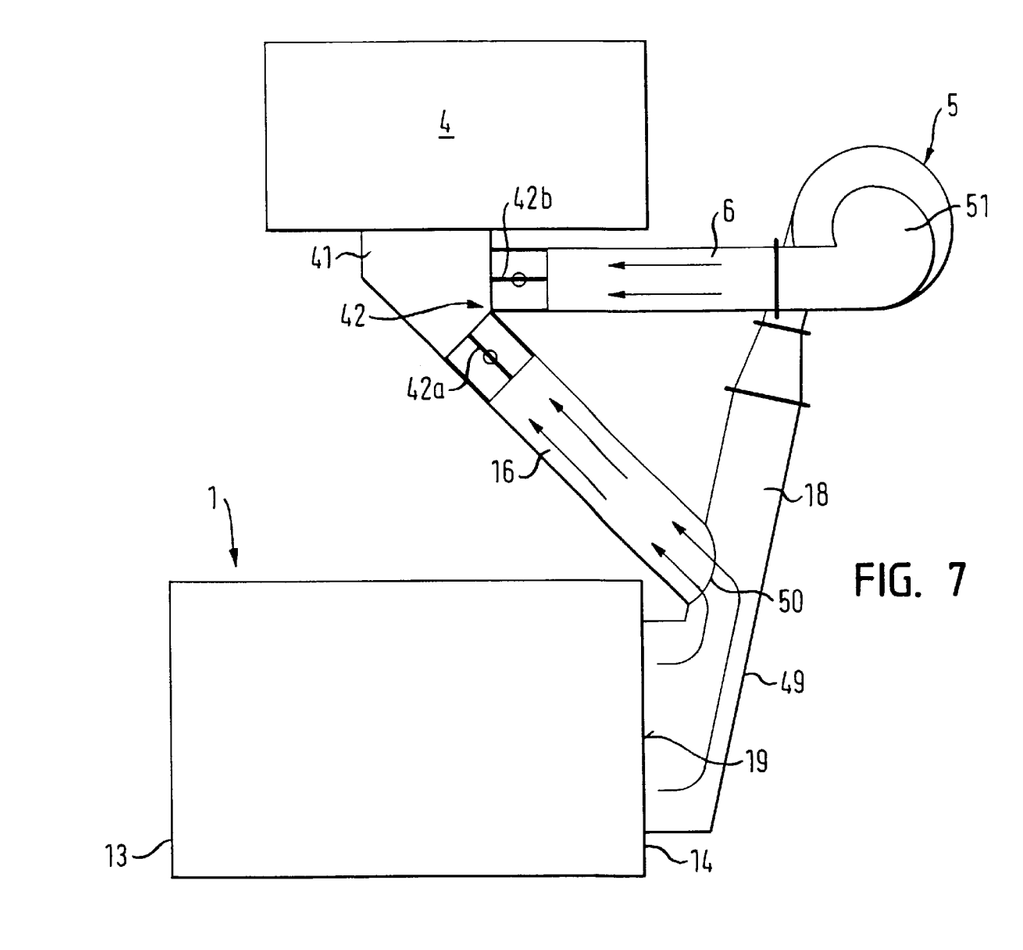
FIG. 7 is a top plan view, similar to FIG. 5 or FIG. 6, of the second embodiment in a third operating position.

An embodiment of the invention as illustrated in FIGS. 5 to 7 will now be described. The same reference numerals as before are used for like elements or groups of elements having similar effect as in the embodiment according to FIGS. 1 to 4. To avoid repetitions, such like elements will be described below only to the extent that they differ from the embodiment shown in FIGS. 1 to 4.

A first important difference is to be seen in the circumstance that a discharge belt is missing in the drawing of the embodiment in FIGS. 5 to 7. This means that the embodiment according to FIGS. 5 to 7 may be chosen to operate either with or without a discharge belt for excess powder such as illustrated in FIGS. 1 to 4.

Another important difference is that the embodiment according to FIGS. 5 to 7 has only one exhaust opening 19 which is provided at the right hand side of the compartment in FIGS. 5 to 7. This exhaust opening 19 leads to a conduit portion 49 which splits at a fork member or junction 50 into a first conduit 16 and a second conduit 18.

A control means 42 comprises two throttle members, one throttle flap 42a in the first conduit 16 and one throttle flap 42b in the third conduit 6, which interconnects the outlet 51 of the recovery unit 5 and the filter inlet casing 41.

The throttle flaps 42a and 42b are individually adjustable by means of a control unit 7 about their respective fulcrums (not shown) between two limit positions. One is an open position at which the throttle flaps are oriented parallel to the direction of flow in the corresponding conduits 16, 6 and the other one is a closed position at which the throttle flaps are oriented transversely of the direction of flow in the conduits 16, 6 mentioned. The control unit 7 is shown only in FIG. 5 for the sake of simplifying matters.

The control unit 7 acts through signal lines upon drive means (not shown) by which the throttle flaps 42a, 42b are adjustable individually in any desired intermediate positioning.

FIG. 5 illustrates an operating condition at which the throttle flap 42a is in closed position and the throttle flap 42b is in fully open position. In this situation any residual powder which has not been recovered is passed through the third conduit 6 for refiltering in the filter unit 4 and subsequent removal.

FIG. 6 illustrates an operating condition at which the throttle flap 42a is fully open and the throttle flap 42b is closed. In this situation all the excess powder sucked off is passed through the conduit 16 directly into the filter unit 4, bypassing the recovery unit 5. It is filtered in the filter unit and then removed for waste management.

FIG. 7 illustrates a third operating condition at which both throttle flaps 42a and 42b are open. In this situation a stream of air is sucked through the compartment 1, the recovery unit 5, and the conduits 18, 6, and 16 directly into the filter unit 4 for cleaning purposes. In actual practice the optimum orientation of the throttle flaps 42a, 42b varies individually and is not always identical with the fully open position as illustrated in FIG. 7. The control unit 7 permits optimum individual adjustments of both throttle flaps 42a, 42b in correspondence with the configuration of the respective assembly. The positions thus may be different from one assembly to the next and may be determined and fix-programmed at the works or in a test run when first put to use by the customer.

The throttle flaps 42a, 42b are not mounted at the fork member 50 where almost unavoidable contamination would affect the coating quality. Instead they are provided near the outlets of the conduits 6, 16, in other words at locations where any contamination will have no influence on the quality of the coating. Expensive cleaning at these places is not required as the throttling is effected at locations where the coating quality will not suffer from contamination. The fork member 50 with no throttle flaps inside it can be cleaned easily and rapidly.

The compartment 1 may be designed in the same variant ways as described with reference to FIGS. 1 to 4.

The specification has made it clear that distinct separation is achieved between transportation of excess powder through the conduit 16 directly to the filter unit 4, on the one hand, and transportation through the conduits 18 and 6 and the detour via the recovery unit 5, on the other hand. This separation offers the opportunity to change over quickly and with little cleaning expenditure between the two operating modes while, at the same time, largely avoiding contamination which might threaten the quality of the coating.

What is claimed is:

1. A powder coating assembly comprising a compartment in which workpieces are coated with powder and which has at least one exhaust opening through which a flow containing air and excess powder can be conveyed from the compartment to a recovery unit or a filter unit, wherein a first conduit connects the filter unit and a second conduit connects the recovery unit via said at least one exhaust opening to the interior of the compartment for conveying excess powder from the bottom of said compartment, wherein a control means is provided for selective control of the flow from the exhaust opening through the first conduit to the filter unit or through the second conduit to the recovery unit or for control of a flow of air through the first and second conduits at the same time for cleaning purposes, a third conduit is arranged between an inlet of the filter unit and an outlet of the recovery unit, and the control means comprises a second throttle member arranged in the third conduit which connects the recovery unit to the filter unit.

2. The powder coating assembly as claimed in claim 1, wherein the control means comprises a first throttle member located in the first conduit.

3. The powder coating assembly as claimed in claim 2, wherein with one throttle member in closed position, the other throttle member is in open position.

4. The powder coating assembly as claimed in claim 2, wherein for cleaning purposes, both throttle members are adapted to be moved into open positions which can be predetermined individually.

5. The powder coating assembly as claimed in claim 1, wherein only one exhaust opening is provided at one end of the compartment, and a junction branching into the first and second conduits is provided downstream of the exhaust opening.

6. The powder coating assembly as claimed in claim 1, wherein a discharge belt for conveying excess powder towards the exhaust opening is provided in the compartment.

7. The powder coating assembly as claimed in claim 1, wherein the compartment is provided with a discharge belt for conveying excess powder and with two exhaust openings spaced apart in the workpiece feeding direction of workpieces to be conveyed into the compartment, the first conduit communicating with one exhaust opening and the second conduit communicating with the other exhaust opening and the conveyance of powder through the exhaust openings being adapted to be shut off alternatively by the control means and the discharge belt is adapted to the driven in the respective direction which leads to the unblocked exhaust opening.

8. The powder coating assembly as claimed in claim 7, wherein the control means comprises a shutoff member adapted to be switched into a position blocking the first conduit and clearing the second conduit, and vice versa.

9. The powder coating assembly as claimed in claim 8, wherein switchover of the shutoff member enforces reversing the direction of movement of the discharge belt.

10. The powder coating assembly as claimed in claim 8, wherein reversal of the direction of movement of the discharge belt enforces switching over of the shutoff member.

11. The powder coating assembly as claimed in claim 8, where the two exhaust openings are provided at the end surfaces of the compartment.

12. The powder coating assembly as claimed in claim 8, wherein the shutoff member is a slide valve which is movable rectilinearly between two shutoff positions in one of which the slide valve blocks the first conduit and in the other one of which the slide valve blocks the third conduit towards the filter unit.

13. The powder coating assembly as claimed in claim 8, wherein the shutoff member is movable into a position in which both conduits communicate at least partly with the filter unit.

14. The powder coating assembly as claimed in claim 2, wherein the compartment is provided with a discharge belt for conveying excess powder and with two exhaust openings spaced apart in the workpiece feeding direction of workpieces to be conveyed into the compartment, the first conduit communicating with one exhaust opening and the second conduit communicating with the other exhaust opening and the conveyance of powder through the exhaust openings being adapted to be shut off alternatively by the control means, and the discharge belt is adapted to be driven in the respective direction which leads to the unblocked exhaust opening.

* * * * *